May 5, 1953 L. E. HARPER 2,637,434
BELT TYPE GRAVIMETRIC FEEDER
Filed July 3, 1946 3 Sheets-Sheet 1

Fig. 1.

INVENTOR.
LYNDUS E. HARPER
BY Alfred R. Fuchs
ATTORNEY

May 5, 1953 L. E. HARPER 2,637,434
BELT TYPE GRAVIMETRIC FEEDER
Filed July 3, 1946 3 Sheets-Sheet 2

Fig. 2.

INVENTOR.
LYNDUS E. HARPER
BY Alfred R. Fuchs
ATTORNEY

May 5, 1953   L. E. HARPER   2,637,434
BELT TYPE GRAVIMETRIC FEEDER
Filed July 3, 1946   3 Sheets-Sheet 3

INVENTOR.
LYNDUS E. HARPER
BY Alfred R. Fuchs
ATTORNEY

Patented May 5, 1953

2,637,434

UNITED STATES PATENT OFFICE 2,637,434

BELT TYPE GRAVIMETRIC FEEDER

Lyndus E. Harper, Chicago, Ill., assignor to Omega Machine Company, Providence, R. I., a corporation of Missouri Application July 3, 1946, Serial No. 681,385

17 Claims. (Cl. 198—39)

My invention relates to belt type gravimetric feeders, and more particularly to means for controlling the feeding operations of gravimetric feeding devices.

It is a purpose of my invention to provide a gravimetric or weight controlled feeding device, in which the rate of feed can be very closely and very accurately controlled.

It is a further purpose of my invention to provide a device of the above mentioned character that is provided with an exact proportioning control. In feeding devices that have been previously provided, it is necessary that the weighing means be out of balance in order that the rate of feed will be maintained at either an increased or a decreased amount from that which would exist when the weighing means is in a balanced condition. Thus, while in such devices the control of the feeding means is by means of a weighing device, or is weight controlled, the rate of feed is dependent upon the position of the scale beam or member that is dependent in its position upon the amount of material that is being weighed by the weighing means, but the rate of feed to which the device is adjusted by the scale beam moving out of balanced position is not maintained after said scale beam has returned to balanced position, but again either increases or decreases, dependent upon the out of balanced position of the scale beam that previously existed, whereupon the scale beam will again move out of normal position and the feed will again be either increased or decreased, as the case may be. This results in a fluctuating or undulating feeding action, which is particularly undesirable of feeding devices of rather large capacity.

My invention provides means that is weight responsive for adjusting a feeding means, which will adjust the rate of feed as soon as the scale beam or similar member moves out of balanced position, and will continue to adjust the feeding means to remedy the rate of feed to restore the scale beam or similar weight responsive member to balanced or normal position, by changing the adjustment of the feeding means all of the time that the weight responsive means is out of its normal or balanced position, and by maintaining the feeding means in its adjusted position all of the time that the weight responsive member is in its normal predetermined position or balanced.

It is a further purpose of my invention to provide means for controlling the feeding means, which comprises means that not only adjusts the rate of feed the whole of the time that the weight responsive member is not in normal or balanced condition, but which adjusts the feeding means in accordance with the direction of movement of the weight responsive means and in accordance with the amount of such movement, thus adjusting the rate of feed in proportion to the amount that the scale beam or similar weight responsive member is out of balance, due to the fact that the rate of feed is not the desired rate of feed.

More particularly my invention comprises means for adjusting the rate of feed of a feeding member, comprising weight responsive means, such as a scale beam, the position of which is determined by the material that is fed onto a conveyor belt per unit of length of said belt, including electrically actuated means for adjusting a feeding member at a constant rate, and means for controlling the operation of said electrically actuated means, which closes the circuit to operate the electrically actuated means for adjusting the feeding member for a length of time proportional to the amount of movement of the weight responsive member out of normal position, and thus proportional to the amount that the rate of feed is out of adjustment.

More particularly my invention comprises weight responsive means, including a scale beam, the position of which is responsive to the weight of material that is in position on a defined length of a conveyor belt, which is moving at a predetermined constant rate over a weighing device, and which, when the rate of feed is that to which the device is adjusted, is the weight required to balance a weight or similar means, counterbalancing the weight of the material, to maintain the scale beam or similar member in a balanced position, and means actuated by the position of said scale beam for controlling the adjustment of the feeding device, including switching means controlling circuits so as to adjust the feeding means in one direction when the scale beam is out of balance in one direction, and to adjust the feeding means in the opposite direction when the scale beam is out of adjustment in the other direction.

Specifically my invention comprises scales having means thereon for supporting a predetermined length of a conveyor to which material is fed, and a scale beam having an adjustable weight thereon for controlling the rate of feed of the feeding means, to feed the amount of material to counterbalance said weight, onto a length of said conveyor equal to that being weighed at any one time by the scales, and means for controlling the feeding means that feeds the material to the conveyor, comprising circuit controlling means affected by the position of the scale beam in such a manner that controlling circuits are closed for periods dependent upon the amount that the scale beam is out of balance, to change the adjustment of the feeding means in direct proportion to the amount that the scale beam is out of balance, due to the rate of feed of the material being different from that to which the weight responsive means is adjusted.

Preferably, my improved feed controlling means comprises a cam member rotated at a constant rate of speed, which is so shaped that a flexibly mounted member will be in contact with said cam member for a length of time dependent upon the amount that the scale beam is out of balanced position, to control a feed adjusting circuit to close it for a corresponding length of time.

It is a particular purpose of my invention to provide means for controlling the rate of feed of a feeding means that includes a motor which is reversible and which operates at a constant rate, so that the length of time of operation thereof will determine the amount of movement of a part driven by said motor in a given direction, and thus the amount that a feeding device is adjusted in that particular direction, the operation of said reversing motor being controlled by means of a scale beam through means such as above described, so as to operate in a direction dependent upon the direction in which the scale beam is out of balance, and for a length of time determined by the amount that the scale beam is out of balance.

It is a very important purpose of my invention to provide a device of the above mentioned character, in which the controlling means is so arranged that when the scale beam is in balance, the controlling circuits will remain open so that the feed adjusting member will remain in its previously adjusted position as long as the scale beam remains in balance.

It is another important purpose of my invention to provide controlling means of the above mentioned character, that is so constructed and arranged that the contact pressure of electrical contact means that may be used as part thereof will have no effect on the balance or movement of the scale beam in the direction in which it moves when responding to the weight that is on the predetermined length of conveyor that is operating over the weighing means.

It is also a purpose of my invention to provide means for halting the operation of the feeding means in case the adjusting means should not operate properly, so as to prevent excessive overload on the feeding belt, and also to provide means for halting the conveyor belt operating over the weighing means, should the feeding means fail to supply the proper amount of material to the conveying means that operates over said weighing device, due to either faulty operation of the feeding means or because the hopper is empty, or other failure of the supply of material that is to be fed, so as to prevent an excessive underload from passing over the conveyor and to the device or apparatus to which the material is being fed.

Other objects and advantages of my invention will appear as the description of the drawings proceeds. I desire to have it understood, however, that I do not intend to limit myself to the particular details shown or described, except as defined in the claims.

Referring in detail to the drawings, my improved feeding means, preferably, comprises a scale 10, having a platform 11 upon which is mounted in any suitable manner, as by means of a frame having a portion 12 mounted on the platform, and side members 13 mounted on said member 12, the rollers 14 over which the conveyor belt 15 operates. Said side members 13 may be provided with a guide plate 16 underlying the conveyor belt 15 between the rollers 14 to support the belt and prevent sagging thereof, should this be found desirable. The weight of material that is on the conveyor belt 16 between the rollers 14 will operate the scale mechanism to determine the position of the scale beam 17, the scale mechanism being of any suitable character, such as ordinarily provided for platform scales, and not being shown in the drawings, as the particular structure thereof is not a part of this invention. A sliding weight 18, or similar member, is provided on the scale beam for adjusting the apparatus to obtain a balance of the scale beam when the desired rate of feed of material is taking place that the amount of material fed, that is on the conveyor belt between the rollers 14, will exactly counterbalance the weight 18. Obviously a scale can be provided on the scale beam that will indicate the rate of feed in any desired units for the setting of the weight 18 along the length of said scale beam.

Figure 1:
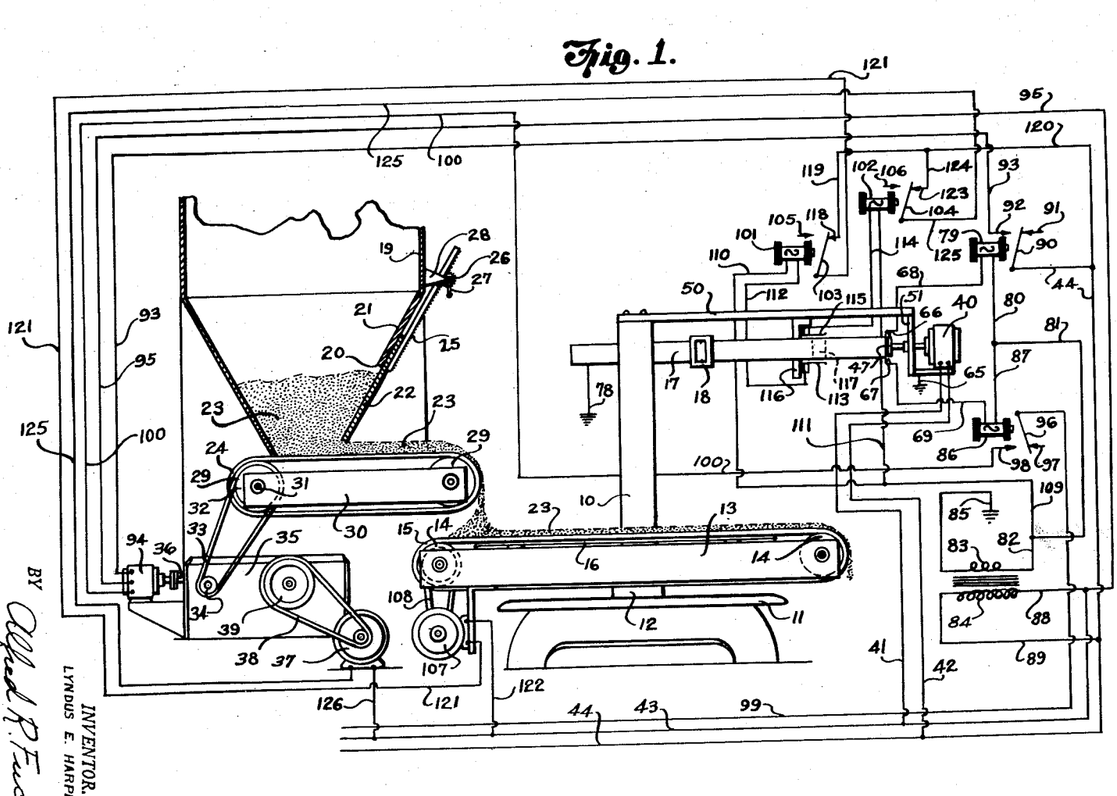
Fig. 1 is a view partly in elevation and partly in section, and partly diagrammatical, showing one form of my improved feeding means.

In the form of the invention shown in Fig. 1 the material that is fed to the conveyor belt 16 is fed from a hopper 19, which has an opening 20 in an inclined bottom wall 21 thereof, the size of which is adjustable by means of a slide 22, so as to obtain the desired rate of feed through said opening of the material 23 that is in the hopper to a conveyor belt 24. The position of the slide or door 22 is, preferably, determined by manually adjustable means, comprising any suitable self-locking adjusting means, such as the rack 25 and pinion 26, the rack 25 being fixed on the slide 22 and the pinion 26 engaging said rack and being rotated by means of a crank 27, the shaft carrying said crank 27 and pinion 26 being mounted in any suitable manner on the body of the hopper 19, as by means of bracket members 28.

The conveyor belt 24 operates over a pair of rollers 29, which are mounted in any suitable manner on a frame having the longitudinally extending members 30, the shaft 31 of the roller 29 having a pulley 32 fixed thereon, over which a belt 33 operates, which is driven by means of a pulley 34 of a variable speed transmission 35, the output speed of which is the speed of the pulley 34 and is exactly proportional to the position of a follower, or followers, along the axis of a cam, or cams, which are rotated at a constant speed, said variable speed transmission being of substantially the same character as that shown in my co-pending application Serial No. 500,082, filed August 26, 1943, on Variable Speed Transmission, Patent No. 2,404,231, patented July 16, 1946. The axial adjustment of the followers of the variable speed transmission 35 is determined by means of the shaft 36, rotation of said shaft in one direction adjusting the followers in a direction parallel to the axis of the cam shaft in such a direction as to increase the rate of rotation of the output pulley 34, and rotation of the shaft 36 in the reverse direction adjusting said followers in a direction parallel to the axis of the cam shaft so as to decrease the rate of rotation of the output pulley 34. The means for driving the variable speed transmission comprises a constant speed motor 37, which drives a belt 38 that operates over a pulley 39 on the input shaft of the variable speed transmission 35.

Figure 3:
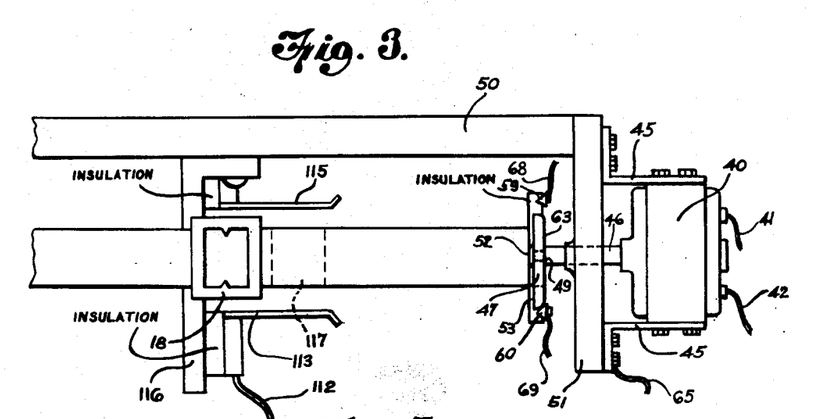
Fig. 3 is a fragmentary elevational view, on an enlarged scale, partly broken away, of the contact operating end of the scale beam and cooperating means for controlling the rate of feed of the feeding means.
Figure 5:
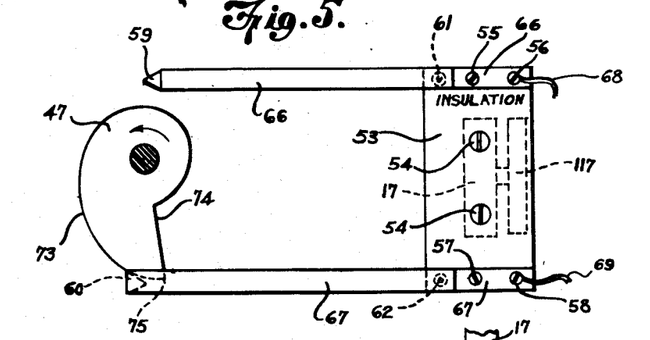
Fig. 5 is an elevational view taken partly in section substantially on the line 5—5 of Fig. 4 with the parts in the position shown in Fig. 4.

Mounted adjacent the scale beam 17 is a constant speed electric motor 40, the same being, preferably, a small synchronous alternating current motor, such as ordinarily utilized for operating small mechanisms, such as electric clock mechanisms. Conductors 41 and 42 extend from the line wires 43 and 44 to said motor 40 to constantly rotate the same at a constant speed. The motor 40 is shown as being mounted on the horizontal frame member 50 of the scale 10 (see Figs. 3 and 5), being mounted by means of angle brackets 45 on a bracket 51 depending from the frame member 50. The motor 40 has a shaft 46 on which is fixed a cam 47 to rotate therewith, said shaft operating in a bearing 48 in the bracket 51, and having any suitable means for holding said cam in fixed position axially of said shaft, said shaft being, preferably, provided with a reduced portion to provide a shoulder at 49, suitable means 52 being provided to hold said cam against the shoulder 49 so that the same will be in position to properly cooperate with the contact members to be described below.

The insulating bracket 53 is fixed on the end of the scale beam in any suitable manner, as by means of the screws 54. Secured to said bracket 53 of insulation by means of the screws 55 and 56 is a contact member 66 of resilient material, and secured to said bracket 53 by means of screws 57 and 58 is a contact member 67 of resilient material. The contact member 66 has an end portion 59 extending at an oblique angle to the body portion of said contact member and tapering to a blunt contact point, and the contact member 67 has an obliquely extending portion 60 bent back on itself and tapering to a blunt contact point.

An adjusting screw 61 is provided for the contact member 66 and a similar adjusting screw 62 is provided for the contact member 67, by means of which said contact members can be aligned with the cam 47 so that the blunt ends of the obliquely extending portions of said contact members will engage the face 63 of the cam 47 with a light spring pressure sufficient to make a good electrical contact whenever either the member 66 or 67 is moved into position to make such contact, by movement of the scale beam 17.

Figure 4:
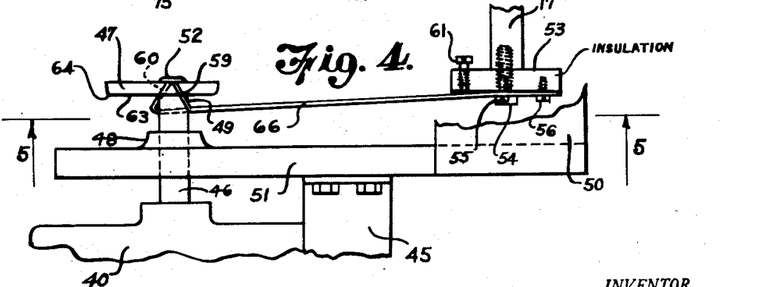
Fig. 4 is a fragmentary top plan view of the cooperating contacts and associated parts.

It will be noted that the cam member 47 has a gradually rising peripheral face 73, which terminates in an offset or shoulder 74, joining the low point of said cam with the high point thereof. In the position of the parts shown in Figs. 3, 4 and 5 the contact members 66 and 67 are just cleared by the high point 75 of the cam. There is no necessity for any great amount of mechanical clearance, due to the fact that a very low voltage current will pass through the circuit in which the contacts 66 or 67 are located. Should the scale beam become slightly out of balance due to an excessive amount of material 23 being fed by the conveyor member 24 to the conveyor member 15, the shoulder 74 on the cam member 47 will engage the contact member 66, moving it from the position shown in Fig. 4 into a position so as to slide along on the face 63 of the cam 47. The contact 66 will be, in effect, brushed aside, to the extent that it will lightly engage said face 63 of the cam 47, the blunt point on said contact member 66 riding along on the face 63 until it intersects the rising face 73 of the cam, whereupon it is immediately sprung back to its normal position. The cam is provided with a beveled or rounded edge 64 leading from the peripheral edge of said cam to the face 63, to guide the contact members into engagement with said face.

It will be obvious that the rising face 73 of the cam can be so shaped that the end of the contact 66, or the corresponding end of the contact 67, will engage the face 63 of the cam 47 for a period of time that will be in proportion to the amount that the scale beam is out of balance, and that if the scale beam is out of balance as much or more than the height of the offset or shoulder 74, the contact of the cam face with the particular contact member 66 or 67, as the case may be, will be continuous until the feed is adjusted in a manner to be described below, to restore the scale beam to a balanced condition. Preferably, the rate of rotation of the cam 47 and the speed of the conveyor 15 is such that a length of conveyor 15 equal to that located between the pulleys 14 will pass over the scale for each rotation of the cam shaft 46. While this arrangement is preferred, any fixed ratio of the rate of rotation of the cam shaft and the rate of travel of the conveyor belt 15 can be utilized that may be preferable. It will be obvious that if the cam 47 rotates once for each length of conveyor belt equal to that between the pulleys 14 that is weighed, if the adjustment of the feed is accomplished by a single rotation of the cam 47 actuating the controlling device to accomplish such adjustment, the scale beam 17 will again be balanced, and on the next rotation of the cam the high point 75 of the cam will clear the contact 66 and no further adjustment of the feeding means will occur. If the adjustment has not been completely successful in getting the proper rate of feed for which the device is set, then on the next rotation of the cam 47 a contact will again be made in the manner above described, but of a much shorter duration, to further adjust the feeding means in a proper direction to obtain the desired rate of feed and to balance the scale beam 17. It will be noted that due to this manner of operation of the device by proper design of the cam, there will be no so-called "hunting" of the apparatus to obtain a balance of the scale beam, that is, the scale beam will not first be thrown out of balance in one direction and then in another direction, due to the fact that the adjusting means will adjust the feed too much first in the one direction, causing an overbalance in the one direction, and necessitating another adjustment in the other direction to correct that overbalance.

Referring to Fig. 1 it will be noted that the scale beam 17 is provided with a ground connection 78. The metallic bracket 51 or any other convenient part of the frame conductively connected with the cam 47 through the shaft 46 has a conductor 65 extending therefrom, which constitutes a ground connection. The contact 66 is connected through the conductor 68 with the winding of a relay 79, which is connected through the conductors 80, 81 and 82 with the secondary winding 83 of a transformer having a primary winding 84, the other end of the secondary winding being connected with the ground connection 85. The contact 67 is connected through conductor 69 with the winding of a relay 86, from which the conductor 87 leads to the conductor 81 connected with the secondary 83 of the transformer in the manner above described. The primary 84 of said transformer is connected with the line wires 43 and 44 by means of the conductors 88 and 89. The conductors 68 and 69 are connected with the contact members 66 and 67, respectively, through screws 56 and 58, which also serve as binding screws. Accordingly, when the contact 66 engages the cam 47 the relay 79 is operated, and when the contact 67 engages the cam 47 the relay 86 is actuated.

When the winding of the relay 79 is energized to attract the armature 90, which is normally biased, to engage the stop member 91, said armature 90, which is a switching element, engages the switching element 92 to connect the conductor 93 with the conductor 44. The conductor 93 leads to one terminal of the reversing motor 94, which drives the shaft 36. A conductor 95 extends from the central terminal of the motor 94 to the conductor 43. The terminals to which the conductors 93 and 95 are connected are such that when the circuit is completed through these conductors to the motor 94 it will be rotated in a direction to rotate the shaft 36 in the proper direction to increase the speed of the shaft 34 by means of the variable speed transmission 35. Thus, when the scale beam 17 lowers out of balanced position the circuit to the motor 94 will be closed to adjust the variable speed transmission, to increase the speed of the output pulley 34 and thus of the conveyor belt 24 and this adjustment will continue as long as the contact 66 engages the cam 47, which will be as long as the scale beam 17 is out of balance, so as to be below its normal or balanced position. This adjustment will obviously adjust the amount of material 23 fed to the conveyor belt 15, so as to obtain the rate of feed desired for the setting of the adjustable weight 18 on the scale beam 17.

On the other hand, if the contact 67 engages the cam 47, because the scale beam 17 is raised above its balanced position, then the relay 86 will be energized, attracting the armature 96, which is normally biased to engage the stop means 97, causing the armature, which is a switching member, to engage the stationary contact 98, completing the circuit between the line conductor 99, and the conductor 100, which leads to the third pole of the motor 94. The conductor 99 has such phase relation to the conductor 44 that when the conductors 43 and 99 are connected with the terminals of the motor 94 through the conductors 95 and 100 the direction of rotation of the motor 94 will be reversed, and the direction of rotation of the shaft 36 will be reversed, thus causing an adjustment of the variable speed transmission 35 such that the rate of rotation of the pulley 34 will be decreased and the rate of feed of the material 23 by means of the conveyor belt 24 will be decreased, so that the scale beam 17 will be brought back into a balanced position due to the fact that the proper amount of material is being fed over the length of the conveyor 15 located between the pulleys 14 to counterbalance the weight 18 for the adjusted position of said weight, this being accomplished in a similar manner to that above described in connection with the contact member 66.

The variable speed mechanism is so constructed that the adjustment of the rate of rotation of the pulley 34 on the output shaft of the variable speed transmission will be in direction proportion to the amount that the shaft 36 rotates in a given direction. Thus the length of time that the circuit is closed to the motor 94 through either the conductors 93 and 95, or the conductors 95 and 100, will determine the amount of adjustment of the speed of the output shaft on which the pulley 34 is mounted and thus of the speed of the conveyor 24, which determines the rate of feed to the weighing conveyor 15.

Means is provided for halting the operation of the conveyor 15 in case the hopper 19 becomes empty, and for halting the operation of the conveyor 24 should there for some reason be such a great over-supply of material 23 being fed thereto that the normal adjusting means does not promptly adjust the rate of travel of the conveyor 24 to feed the proper amount of material 23 to the conveyor 15. The means provided for this purpose prevents any excessive underload or overload of the conveyor 15. Said means comprises a relay 101 and a relay 102, the relay 101 being provided with an armature 103, and the relay 102 with an armature 104, the armature being so biased in the case of each relay that it will engage normally with a contact to close the circuit when the windings of the relays 101 or 102 are not energized, and engage the stops indicated at 105 and 106 when said windings are energized. The relay 101 controls the operation of the motor 107, which drives the conveyor 15 through the belt 108, while the relay 102 controls the operation of the motor 37, which drives the variable speed mechanism 35 and thus the conveyor 24.

A conductor 109 extends from the conductor 82 and has branches 110 and 111 that are each connected to one end of the windings of the relays 101 and 102, respectively. A conductor 112 leads from the winding of the relay 101 to a flexible contact member 113 and a conductor 114 leads from the other end of the winding of the relay 102 to a flexible contact member 115. The contact members 113 and 115 are insulatingly mounted on a bracket 116 depending from the member 50 of the scale. The said contacts engage any suitable means mounted on the scale beam 17 out of alignment with the weight 18, so as to not interfere with the adjustment thereof and can readily engage a rigid contact 117 mounted on a rearwardly extending bracket on said scale beam, upon the scale beam being moved a predetermined amount out of balanced position. Thus, if the scale beam 17 drops further than would normally occur due to such variations in the feed as can be properly adjusted by means of the previously described rate of feed adjusting means, or under excessive underload on the conveyor 15, or emptying of the hopper 19, the circuit through the winding of the relay 101 will be completed through the conductors 82, 109, 110, 112, contact 113, contact 117, and through the scale beam 17 to the ground connection 78, whereupon the armature 103 will be attracted so as to open the circuit to the motor 107, which is normally closed due to engagement of the contact 103 with a stationary contact 118, which is connected by means of the conductor 119 with a conductor 120 extending from the line wire 44, the movable contact member or armature 103 being connected by means of the conductor 121 with one terminal of the motor 107, the other terminal of which is connected with the line wire 43 by means of a conductor 122.

Thus, when the parts are in the position shown in Fig. 1, the circuit for operating the motor 107 extends from the line wire 44 through the conductors 120, 119, 121 and 122, to the line wire 43, and upon excessive underload on the conveyor 15 the circuit is opened by means of the relay 101 to stop the operation of the motor 107.

The movable switching member or armature 104 cooperates with a fixed contact member 123, which is connected through a conductor 124 with the conductor 120, while the armature or movable contact member 104 is connected with a conductor 125, which extends to one terminal of the motor 37, the other terminal of the motor being connected by a conductor 126 with the line wire 43. Accordingly, the circuit through the motor 37 is completed when the parts are in the position shown in Fig. 1 from the line wire 44 through the conductors 120, 124, 125, and the conductor 126 to the line wire 43. However, if there is an excessive amount of material being supplied to the conveyor 24 so as to cause an overload of the material 23 to be fed to the conveyor 15, such that the rate of feed adjusting means can not properly take care thereof quickly, the scale beam 17 will rise so that the contact member 115 will be engaged by the contact 117, which will close the circuit through the winding of the relay 102 through the conductors 82, 109, 111, 114, contact member 115, contact 117, and the scale beam 17 to the ground connection 78, causing the armature 104 to be attracted, breaking the operating circuit of the motor 37 and thus stopping the operation of the conveyor 24 until the overload condition on the conveyor 15 has been corrected, due to the fact that no material is being fed to the conveyor 15 from the conveyor 24.

Figure 2:
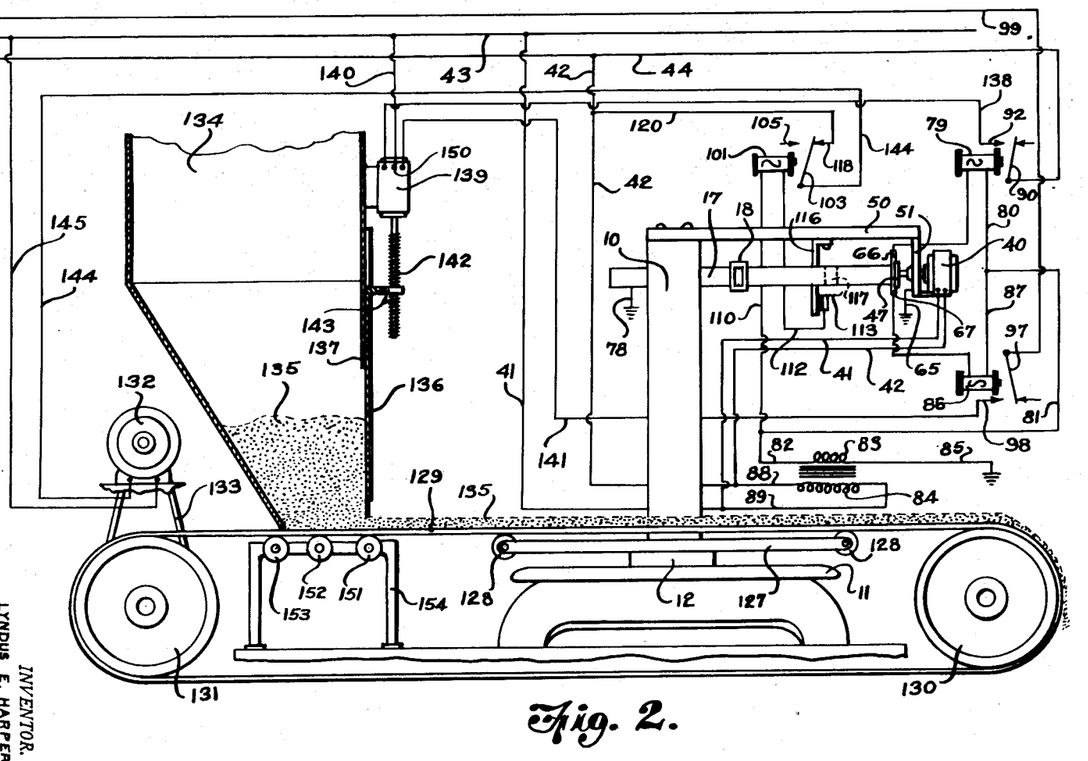
Fig. 2 is a similar view of another form thereof.

Instead of providing the feeding mechanism shown in Fig. 1, the feeding mechanism shown in Fig. 2 can be provided, said feeding mechanism comprising the scale 10 having the platform 11, previously described, upon which there is mounting means 12 for a frame member 127 having suitable bearings thereon for the conveyor rollers 128. Said rollers support the length of conveyor belt 129, which lies between said rollers, so that a definite length of said conveyor belt will be continuously weighed by the scale having the platform 11. The conveyor belt 129 operates over the rollers 130 and 131, which are mounted on any suitable bearings independently of the scale 10, the roller 131 being driven by a motor 132 through the belt 133. A hopper 134 is provided, within which the material 135 is confined, which is fed to the belt 129, and the amount of material that is fed to the belt in any given period of time is determined by the amount of opening under the bottom edge of the door or slide 136, which closes the opening 137 in the side wall of the hopper at the bottom end thereof. The amount that the door or slide 136 is opened is controlled by the weighing apparatus comprising the scale 10 having the platform 11, and is thus controlled by the weight of material 135 passing along on the conveyor belt 129 between the rollers 128. The means for controlling the rate of feed is the same in general principle as that previously described, and the details of construction of said controlling means is the same as in the form of the invention shown in Fig. 1, the same reference numerals being applied to the parts that are the same in Figs. 1 and 2.

The conductors 41 and 42, respectively, extend from the line wires 43 and 44 to the motor 40 to drive the same, said motor rotating the cam 47, which is the same as previously described and with which the contacts 66 and 67 are adapted to engage, these being mounted on the scale beam 17 in the same manner as previously described. Said contacts cooperate with the cam 47 in the same manner as described in connection with Fig. 1 under movement of the scalebeam 17 out of normal position to energize the relays 79 and 86 in the manner previously described. The transformer having the primary winding 84 and secondary winding 83 has the secondary thereof connected with the relays through the conductors 80, 87, 81 and 82 in the same manner as previously described, the circuit being completed through the winding of the relay 79 when the contact 66 is engaged by the cam 47, and the circuit being completed through the winding of the relay 86 when the circuit is completed through the contact 67 by engagement of the cam 47 therewith in the same manner as described in connection with Fig. 1. The line wire 44 is connected with the armature 90, as previously described, and a conductor 138 extends from the stationary contact member 92 to one terminal of the reversing motor 139, a conductor 140 extending from the line wire 43 to the middle terminal 150 on said reversing motor 139, while a conductor 141 extends from the other terminal of said motor 139 to the stationary contact 98, with which the armature 97 of the relay 86 is adapted to engage, the armature 97 being connected with the line wire 99. The line wires 99, 43 and 44 have such phase relation that when the wires 43 and 44 are connected with the respective terminals of the motor to which the conductors 138 and 140 lead, said motor 139 will be rotated in one direction, while if the line wires 143 and 99 are connected with the motor 139 through the conductors 140 and 141, the rotation of said motor will be in the opposite direction to that previously stated.

The motor 139 may be provided with a shaft that is provided with a screw-threaded portion 142, which screw-threadedly engages in an opening in an ear 143 provided on the door or slide 136. As the door or slide is, of course, mounted for straight line movement between any suitable guides, the rotation of the shaft of said motor 139 will cause movement longitudinally of said shaft of the ear 143 and thus of the door or slide 136 in the direction of length of the shaft. Rotation of the motor 139 in one direction will cause the shaft to rotate in that direction and the screw-threaded portion 142 thereof engaging the ear 143 will cause the slide 136 to move in one direction, while rotation of the motor 139 in the opposite direction will cause the slide 136 to be moved in the opposite direction. The amount the slide will move in either direction will be directly proportional to the amount of rotation of the shaft having the screw-threaded portion 142 and thus will be directly proportional to the amount of time that the motor 139 rotates in the particular direction in which adjustment is being made. As the amount of material passing out between the bottom edge of the door or slide 136 and the conveyor belt 129 will be in proportion to the position of the bottom edge of the door 136, the change in the amount of material 135 fed to the conveyor belt 129 will be in direct proportion to the amount of rotation of the motor 139 that has taken place due to operation of the relays 79 and 86, as the case may be, through engagement of the contact 66 or 67 by the cam member 47, and as previously explained in connection with Fig. 1, the length of time that the contact will be completed through either the contact 66 or 67 by the cam 47 during each rotation thereof will be directly proportional to the amount that the scalebeam 17 is out of balance and there will be no contact with either the contact 66 or 67 by the cam 47 when the scalebeam 17 is in balance position.

In order to stop the operation of the conveyor 129, in case there is insufficient material 135 in the hopper 134 to supply the requisite amount to balance the scalebeam 17 to said conveyor 129, the flexible contact member 113 is provided, controlling operation of the relay 101, which normally engages the fixed contact 118, as described in connection with the form of the invention shown in Fig. 1, the same reference numerals being applied to the conductors and other parts of said relay circuit as in the form of the invention shown in Fig. 1, said contact 113 being mounted on the bracket 116 in a similar manner to that previously described, and contacting suitable means on the scale beam 17 as previously described, a conductor 144 extending from the movable contact member 103 to one terminal of the motor 132, and a conductor 145 extending from the other terminal of said motor to the line wire 43.

The circuit is completed from the line wire 43 through the motor 132 to the line wire 44 through the conductors 145, 144, 129 and 42 in a similar manner to that previously described in connection with the relay 101 shown in Fig. 1. The conveyor 129 will thus be halted by the opening of the circuit by movement of the contact 103 away from the contact 118 when the scale beam 17 drops abnormally, due to underload on the conveyor belt 129, thus stopping the operation of said conveyor belt. Obviously any suitable alarm can be provided in case any of the conveyor belts in either of the forms of the invention shown is stopped, due to underload or overload, so as to call the attention of the operator to the fact that the apparatus is not functioning properly. The conductor 88 in the circuit diagram shown in Fig. 2 is shown as extending from one end of the winding 84 to the conductor 42 instead of being directly connected with the line wire 44, and the conductor 89 is shown as being connected with the conductor 41 instead of being directly connected with the line wire 43, this being immaterial from the standpoint of the operation of the circuit. It is, of course, immaterial from the standpoint of the electrical operation of the device, whether these conductors lead directly from the line wires or through another conductor from said line wires.

In the form of the invention shown in Fig. 2, preferably, in order to obtain the greatest accuracy possible of the weighing apparatus, the idler rollers 151, 152 and 153 journaled in bearings on any suitable supporting framework 154 are, preferably, provided with the axis of rotation of the roller 151 in vertical alignment with the door or slide 136. By this arrangement the length of the belt 129 supporting the material 135 between one of the rollers 128 and the roller 151 is the same as the length of the belt 129 extending between the other roller 128 and the roller 130. Any effect of the weight of the material in the hopper 134 on the weighing apparatus is thus eliminated and the weight of material on the belt 129 on opposite sides of the rollers 128 will thus be equalized if a uniform stream of material is being fed out of the opening under the door or slide 136.

In both forms of the invention, when the scalebeam is in balance the rate of feed will be maintained due to the fact that the contact member 47 will be out of engagement with both contacts 66 and 67. In case the rate of feed is less than what it should be, then the circuit will be completed by engagement of the member 47 with the contact 66 to either speed up the belt 24 or raise the slide 136 the proper amount to obtain the desired rate of feed to correct the deficiency in the rate registered by the descent of the scalebeam sufficiently to cause disengagement of the members 47 and 66. When the contact 47 engages the contact 67 the reverse movement of the parts will take place in either form of the invention to reduce the rate of feed to bring the scalebeam 17 back into balance. In either form of the invention, if the scalebeam is in balance there will be no change in the rate of feed. Thus an adjusting means is provided, which will, under all normal operating conditions, maintain substantially a steady rate of feed and at the desired rate for which the apparatus is adjusted, without any so-called "hunting" action or adjustment back and forth through the balanced condition of the weighing means.

What I claim is:

1. Adjustable feeding means and adjustable weight responsive means for controlling the rate of feed of said feeding means, comprising a member assuming a predetermined position whenever the rate of feed of said feeding means is that to which said weight responsive means is adjusted and movable out of such position upon said rate of feed varying from that to which the rate responsive means is adjusted, and means for changing the adjustment of said feeding means only upon movement of said member out of said predetermined position, comprising a cam of fixed contour mounted for rotation, means for continuously rotating said cam, and feed adjustment controlling means cooperating with said cam to change and continue changing the adjustment of said feeding means as long as said member is out of said predetermined position, and to maintain said feeding means in its adjusted position as long as said member is in said predetermined position.

2. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction, comprising a cam of fixed contour mounted for rotation, means for continuously rotating said cam, and feed adjustment controlling means cooperating with said cam to change and continue changing the adjustment of said feeding means in one direction as long as said beam is out of balanced position in accordance with the direction of movement of said beam, and to maintain the adjustment of said feeding means whenever said beam is in balanced position as long as said beam is in said balanced position.

3. Adjustable feeding means and adjustable weight responsive means for controlling the rate of feed of said feeding means, comprising a member assuming a predetermined position whenever the rate of feed of said feeding means is that to which said weight responsive means is adjusted, and movable out of such position in either of two opposite directions upon said rate of feed varying from that to which the weight responsive means is adjusted, and means for changing the adjustment of said feeding means only upon movement of said member out of said predetermined position, comprising a rotatable member, means for continuously rotating said rotatable member, a pair of controlling circuits, one thereof controlling increase of rate of feed and the other controlling decrease of rate of feed, and controlling circuit selecting means cooperating with said rotatable member to select one of said circuits and adjust the rate of said feeding means in one direction as long as said member is out of said predetermined position in a corresponding direction, and acting to select neither of said circuits to maintain the existing adjustment of said feeding means whenever said member is in said predetermined position as long as said member is in said predetermined position.

4. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction, comprising a rotatable member, means for continuously rotating said member, feed controlling circuits, and controlling circuit selecting means cooperating with said rotatable member to change and continue changing the adjustment of said feeding means in accordance with the direction of movement of said scalebeam and for an interval in accordance with the amount of movement thereof, said last mentioned means maintaining the existing adjustment of said feeding means whenever said scalebeam is in said balanced position, as long as said beam is in said balanced position.

5. Adjustable feeding means and adjustable weight responsive means for controlling the rate of feed of said feeding means, comprising a member assuming a predetermined position whenever the rate of feed of said feeding means is that to which said weight responsive means is adjusted and movable out of such position upon said rate of feed varying from that to which the weight responsive means is adjusted, and means for changing the adjustment of said feeding means only upon movement of said member out of said predetermined position, comprising a feed adjusting member, and electrically actuated means for controlling the operation of said adjusting member, including a controlling circuit comprising switching means mounted to move with said first mentioned member, and cooperating switching means, one of said switching means comprising means mounted for continuous uniform movement toward and away from said other switching means, said other switching means being engaged by said first switching means upon movement of said first mentioned member out of said predetermined position, and being out of engagement therewith when said first mentioned member is in said predetermined position to maintain the existing adjustment of said feeding means whenever said first mentioned member is in its predetermined position as long as said member is in said predetermined position.

6. Adjustable feeding means and adjustable weight responsive means for controlling the rate of feed of said feeding means, comprising a member assuming a predetermined position whenever the rate of feed of said feeding means is that to which said weight responsive means is adjusted and movable out of such position upon said rate of feed varying from that to which the weight responsive means is adjusted, and means for changing the adjustment of said feeding means only upon movement of said member out of said predetermined position, comprising a feed adjusting member, and electrically actuated means for actuating said adjusting member to adjust said member and the rate of feed in proportion to the amount of the same is out of adjustment, including a controlling circuit comprising switching means mounted to move with said first mentioned member, and cooperating switching means, one of said switching means comprising means mounted for continuous uniform movement toward and away from said other switching means, said other switching means being engaged by said first switching means to close said controlling circuit upon movement of said first mentioned member out of said predetermined position, said means mounted for continuous movement engaging said other switching means to maintain said controlling circuit closed for an interval proportional to the amount said first mentioned member is moved out of its predetermined position.

7. Adjustable feeding means and means responsive to the weight of material fed by said feeding means for controlling the rate of feed thereof, comprising a conveyor belt to which said adjustable means delivers, means for weighing a predetermined length thereof, means for driving said conveyor belt, said weighing means comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction in accordance with the direction of movement thereof, comprising cooperating contact members mounted to maintain the existing adjustment of said feeding means whenever said scale beam is in balanced position as long as said beam is in said balanced position, and scalebeam actuated controlling means for said driving means halting the movement of said conveyor upon excessive movement of said scalebeam out of balance, comprising a controlling circuit including contact means mounted on said scalebeam to move therewith and cooperating stationary contact means spaced therefrom during normal rate of feed controlling movements of said scalebeam.

8. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction in accordance with the direction of movement thereof, comprising a feed adjusting member, and electrically actuated means for actuating said adjusting member, including a controlling circuit comprising rotatable contact means, contact means cooperating therewith comprising a contact member engaging therewith upon movement of said scale beam out of balanced position in one direction and a contact member engaging therewith upon movement of said scale beam out of balanced position in the opposite direction, one of said contact means being carried by said scale beam, said actuating means operating to adjust said feed adjusting member in a direction and an amount in accordance with the direction and duration of movement of said beam and said actuating means moving said adjusting member in one direction upon engagement of the rotatable contact means with the one cooperating contact and in the opposite direction upon engagement of said rotatable contact means with the other cooperating contact, said rotatable contact means being so shaped as to remain in engagement with the cooperating contact for an interval in proportion to the amount said scale beam is moved out of balanced position by the weight of material fed by said feeding means, and out of engagement with said cooperating means to halt operation of said electrically actuated means and maintain the existing adjustment of said feeding means whenever said scale beam is in balanced position and as long as said beam is in said balanced position.

9. Adjustable feeding means and means responsive to the weight of material fed by said feeding means for controlling the rate of feed thereof, comprising a scalebeam, an adjustable weight thereon to maintain said scalebeam in a balanced position whenever the rate of feed of said feeding means is that to which said weight is adjusted, and means for changing the adjustment of said feeding means only upon movement of said beam out of balanced position in either direction in accordance with the direction of movement thereof and maintaining the changed adjustment of said feeding means whenever said scalebeam is in balanced position, comprising a feed adjusting member, and electrically actuated means for actuating said adjusting member, including a controlling circuit, scalebeam carried contact means and contact means periodically engaged thereby only when said scalebeam is out of balance to determine the condition of said controlling circuit solely in accordance with the position of said scalebeam, said feed adjusting member adjusting the rate of feed in accordance with the direction of movement thereof, and said actuating means moving said adjusting member in one direction upon movement of said scalebeam out of balance in one direction and in the opposite direction upon movement of said scalebeam out of balance in the other direction, said scalebeam carried means being in open circuit position to maintain said adjusting member in its adjusted position only when said scalebeam is in balanced position and as long as said beam is in said balanced position.

10. Adjustable feeding means and means responsive to the weight of material fed by said feeding means for controlling the rate of feed thereof, comprising a scalebeam, an adjustable weight thereon to maintain said scalebeam in a balanced position whenever the rate of feed of said feeding means is that to which said weight is adjusted, and means for changing the adjustment of said feeding means only upon movement of said beam out of balanced position in either direction in accordance with the direction of movement thereof, comprising a feed adjusting member, and electrically actuated means for actuating said adjusting member, including a controlling circuit, scale beam actuated means for determining the condition of said controlling circuit in accordance with the position of said scale beam, said feed adjusting member adjusting the rate of feed in accordance with the direction and duration of movement thereof and said actuating means moving said adjusting member in one direction upon movement of said scale beam out of balance in one direction and in the opposite direction upon movement of said scale beam out of balance in the other direction, said controlling circuit including continuously moving contact means having means for closing said circuit for an interval in the selected direction proportional to the movement of said scale beam out of balanced position and maintaining said circuit open to maintain said adjusting member in its adjusted position whenever said scale beam is in balanced position as long as said beam is in said balanced position.

11. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction in accordance with the direction of movement thereof, comprising a feed adjusting member, and electrically actuated means for actuating said adjusting member, including a controlling circuit comprising a rotatable contact member, a contact engaging therewith upon movement of said scale beam out of balanced position in one direction and a contact engaging therewith upon movement of said scale beam out of balanced position in the opposite direction, said feed adjusting member adjusting the rate of feed in accordance with the direction and duration of movement thereof and said actuating means moving said adjusting member in one direction upon and during engagement of the rotatable contact with the one cooperating contact and in the opposite direction upon and during engagement of said rotatable contact with the other cooperating contact, said rotatable contact being of such shape as to remain in engagement with either of said cooperating contacts for an interval in proportion to the amount said scale beam is moved out of balanced position by the weight of material fed by said feeding means, said actuating means maintaining said adjusting member in its adjusted position whenever said scale beam is in balanced position as long as said beam is in said balanced position.

12. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction in accordance with the direction of movement thereof, comprising a feed adjusting member, and electrically actuated means for actuating said adjusting member, including a controlling circuit and rotatable means for determining the condition of said controlling circuit in accordance with the position of said scale beam, said feed adjusting member adjusting the rate of feed in accordance with the direction of movement thereof and said actuating means moving said adjusting member in one direction upon movement of said scale beam out of balance in one direction and in the opposite direction upon movement of said scale beam out of balance in the other direction, said actuating means maintaining said adjusting member in its adjusted position whenever said scale beam is in balanced position as long as said beam is in said balanced position.

13. Adjustable feeding means and means responsive to the weight of material fed by said feeding means for controlling the rate of feed thereof, comprising a scale beam, an adjustable weight thereon to maintain said scale beam in a balanced position whenever the rate of feed of said feeding means is that to which said weight is adjusted, and means for changing the adjustment of said feeding means only upon movement of said beam out of balanced position in either direction in accordance with the direction of movement thereof, comprising a movable feed adjusting member, and electrically actuated means for actuating said adjusting member, including a controlling circuit and rotatable means for determining the condition of said controlling circuit in accordance with the position of said scale beam, said feed adjusting member adjusting the rate of feed in accordance with the direction and duration of movement thereof and said actuating means moving said adjusting member in one direction upon movement of said scale beam out of balance in one direction and continuing movement of said adjusting member until said scale beam returns to balanced position and in the opposite direction upon movement of said scale beam out of balance in the other direction and continuing movement of said adjusting member until said scale beam returns to balanced position, said rotatable means being shaped so as to maintain the circuit condition determined by the position of the scale beam for an interval proportional to the movement of said scale beam out of balanced position, said actuating means maintaining said adjusting member in its adjusted position whenever said scale beam is in balanced position as long as said beam is in said balanced position.

14. Adjustable feeding means comprising a belt conveyer and means responsive to the weight of material fed by said feeding means for controlling the speed of said conveyer to control the rate of feed of said feeding means, comprising a member assuming a predetermined position whenever the rate of feed of said feeding means is that to which said weight responsive means is adjusted and movable out of such position upon said rate of feed varying from that to which the rate responsive means is adjusted, and means for changing the speed of said conveyor only upon movement of said member out of said predetermined position, comprising a cam of fixed contour mounted for rotation, means for continuously rotating said cam, and feed adjustment controlling means cooperating with said cam to change and continue changing the speed of said conveyor as long as said member is out of said predetermined position, and to maintain the adjusted speed of said conveyor as long as said member is in said predetermined position.

15. Adjustable feeding means comprising a hopper having an adjustable feed opening and means responsive to the weight of material fed by said feeding means for controlling the size of said opening, comprising a member assuming a predetermined position whenever the rate of feed of said feeding means is that to which said weight responsive means is adjusted and movable out of such position upon said rate of feed varying from that to which the rate responsive means is adjusted, and means for changing the size of said opening only upon movement of said member out of said predetermined position, comprising a cam of fixed contour mounted for rotation, means for continuously rotating said cam, and feed adjustment controlling means cooperating with said cam to change and continue changing the size of said opening as long as said member is out of said predetermined position, and to maintain the adjusted size of said opening as long as said member is in said predetermined position.

16. Adjustable feeding means comprising a belt conveyor and means responsive to the weight of material fed by said feeding means for controlling the speed of said conveyor to control the rate of feed of said feeding means, comprising a member assuming a predetermined position whenever the rate of feed of said feeding means is that to which said weight responsive means is adjusted, and movable out of such position in either of two opposite directions upon said rate of feed varying from that to which the weight responsive means is adjusted, and means for changing the speed of said conveyor only upon movement of said member out of said predetermined position, comprising a rotatable member, means for continuously rotating said rotatable member, a pair of controlling circuits, one thereof controlling increase of speed and the other decrease of speed of said conveyor, and controlling circuit selecting means cooperating with said rotatable member to select one of said circuits and adjust the rate of said feeding means in one direction as long as said member is out of said predetermined position in a corresponding direction, and acting to select neither of said circuits to maintain the adjusted speed of said conveyor whenever said member is in said predetermined position as long as said member is in said predetermined position.

17. Adjustable feeding means comprising a hopper having an adjustable feed opening and means responsive to the weight of material fed by said feeding means for controlling the size of said opening, comprising a member assuming a predetermined position whenever the rate of feed of said feeding means is that to which said weight responsive means is adjusted, and movable out of such position in either of two opposite directions upon said rate of feed varying from that to which the weight responsive means is adjusted, and means for changing the size of said opening only upon movement of said member out of said predetermined position, comprising a rotatable member, means for continuously rotating said rotatable member, a pair of controlling circuits, one thereof controlling increase of size of said opening and the other decrease of size of said opening, and controlling circuit selecting means cooperating with said rotatable member to select one of said circuits and adjust the rate of said feeding means in one direction as long as said member is out of said predetermined position in a corresponding direction, and acting to select neither of said circuits to maintain the adjusted size of said opening whenever said member is in said predetermined position as long as said member is in said predetermined position.

LYNDUS E. HARPER.

References Cited in the file of this patent.

UNITED STATES PATENTS

| Number | Name | Date |
|---|---|---|
| 1,125,705 | Messiter | Jan. 19, 1915 |
| 1,777,670 | Hausman | Oct. 7, 1930 |
| 2,258,457 | Kimball | Oct. 7, 1941 |
| 2,377,765 | Dillman | June 5, 1945 |
| 2,546,866 | Overly | Mar. 27, 1951 |

FOREIGN PATENTS

| Number | Country | Date |
|---|---|---|
| 436,658 | Great Britain | Oct. 16, 1935 |
| 611,824 | Germany | Apr. 6, 1935 |